April 22, 1924.

J. D. BATTON

NUT LOCKING DEVICE

Filed Jan. 24, 1922

1,491,660

Inventor

J. D. Batton,

By *[signature]*

Attorney

Patented Apr. 22, 1924.

1,491,660

UNITED STATES PATENT OFFICE.

JOHNERTHON D. BATTON, OF BESSEMER, ALABAMA.

NUT-LOCKING DEVICE.

Application filed January 24, 1922. Serial No. 531,481.

*To all whom it may concern:*

Be it known that JOHNERTHON D. BATTON, a citizen of the United States of America, residing at Bessemer, in the county of Jefferson and State of Alabama, has invented new and useful Improvements in Nut-Locking Devices, of which the following is a specification.

The object of the invention is to provide an efficient means for securing a nut against accidental disengagement from the bolt upon which it is threaded and particularly to provide a device for this purpose which is susceptible of being used in connection with relatively small articles such as jewelry, lapel buttons, shirt buttons and the like to serve as a guard or safety device for preventing loss of valuable settings and the like; and with these objects in view the invention consists in a construction and combination of parts of which a preferred embodiment is shown in the accompanying drawings, wherein:—

Figure 1:
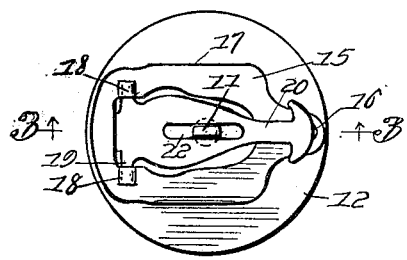
Figure 1 is a plan view of a nut locking device embodying the invention.
Figure 2:
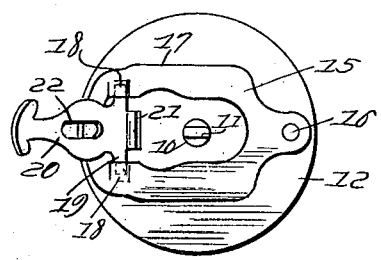
Figure 2 is a similar view showing the locking element in its disengaged position.
Figure 3:
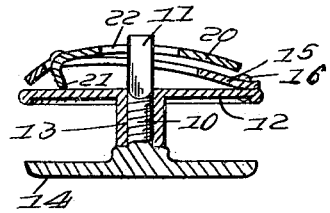
Figure 3 is a section on the plane indicated by the line 3—3 of Figure 1.
Figure 4:
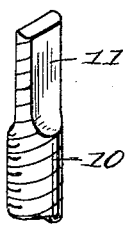
Figure 4 is a detail view of the free end of the bolt.

The bolt 10 is provided with a flattened terminal 11 and the nut 12 which in the construction illustrated is shown as a disk carrying a central threaded sleeve 13 for engagement with the bolt disposed as the stem of a disk or head 14, carries a spring 15 attached as at 16 by a rivet or its equivalent to the nut and having arms 17 which are arranged in straddling relation with the bolt and which are terminally provided with bearings or seats 18 for trunnions 19 at the inner end of a pivotal locking element 20. This locking element is provided with a tongue 21 adjacent to and extending radially from its axis of movement as defined by the trunnion 19 to bear upon the surface of the nut and thus secure the locking element in either its engaged or released position, and moreover said locking element is provided with a slot 22 which when the element is in its normal position engages the flattened extremity 11 of the bolt, said locking element in its engaged or normal position occupying a position in substantial parallelism with the spring element 15 and presenting an exposed convexed surface which is suitable for contact with articles of clothing or the like in connection with which the device provided with the nut locking means may be used. The tendency of the spring element 15 being terminally toward the plane of the nut serves through the agency of the tongue 21 to maintain the locking device in its bolt engaging relation with the nut as indicated in Figures 1 and 3.

Having described the invention, what is claimed as new and useful is:—

1. A device of the class described having in combination with a bolt and nut of which the former is provided with a flattened terminal of a spring attached to the nut and having arms arranged in straddling relation with the bolt, and a locking element pivotally mounted upon the arms of the spring element and provided with a slot for engagement with the flattened terminal of the bolt.

2. A device of the class described having in combination with a bolt and nut of which the former is provided with a flattened terminal of a spring attached to the nut and having arms arranged in straddling relation with the bolt, and a locking element pivotally mounted upon the arms of the spring element and provided with a slot for engagement with the flattened terminal of the bolt, said locking element being provided with a holding tongue yieldingly held by said spring in bearing contact with the surface of the nut.

3. A device of the class described having in combination with a bolt and nut of which the former is provided with a flattened terminal of a spring attached to the nut and having arms arranged in straddling relation with the bolt, and a locking element pivotally mounted upon the arms of the spring element and provided with a slot for engagement with the flattened terminal of the bolt, the locking device having a convexed exposed surface and arranged in parallelism with the said spring, with a bearing tongue in engaging relation with the surface of the nut.

In testimony whereof he affixes his signature.

JOHNERTHON D. BATTON.